United States Patent Office 3,244,755
Patented Apr. 5, 1966

3,244,755
PURIFICATION OF VINYL CHLORIDE
Gene L. Wofford, Texas City, Tex., assignor to Monsanto Company, a corporation of Delaware
No Drawing. Filed Oct. 23, 1961, Ser. No. 147,038
6 Claims. (Cl. 260—656)

This invention relates to the purification of vinyl chloride and, more particularly, to the removal of minor amounts of HCl therefrom.

Vinyl chloride is one of the important monomers of commerce. It is used extensively in the production of synthetic resins or plastics either as a homogeneous polymer or as a constituent of a number of copolymers and/or interpolyers with other polymerizable compounds. To qualify for such use, the monomer product must have an extremely high purity. Otherwise, in the usual polymerization methods, the rate of polymerization is seriously decreased and the quality of the polymerization product may be adversely affected. Decreased polymerization rates, for example, directly affect production rates in the same order since many of the polymerization processes are batch operations where the time element is an essential factor in setting up and meeting production schedules. The presence of HCl, which is a common impurity in vinyl chloride, even in quantities as small as ten parts per million parts of vinyl chloride, is particularly undesirable because it causes development of a yellow color in the monomer which is subsequently carried over to the polymer. This impurity also gives rise to problems in the polymerization cycle because of the necessity for rigid control of pH in the polymerization reaction in order to produce polymer having the desired physical properties, particularly with regard to particle size.

The usual methods of purification such as fractional distillation do not remove HCl satisfactorily and, hence, some sort of additional treatment is required to provide vinyl chloride monomer which will meet the rigid specifications with respect to this impurity. Such treatments include, for example, washing or scrubbing the vinyl chloride in the vapor phase with an aqueous caustic solution or passing the monomer in the liquid phase through a solid caustic scrubber. Adequate removal by the latter method becomes prohibitively expensive because of the size of the beds required for efficient removal or the necessity for loading such a scrubber with other reactants and/or adsorbents. The wet caustic wash is efficient but when this method is used, the vinyl chloride must be subjected to an after-treatment for drying which is both time-consuming and costly. Also, any additional steps after purification by distillation provides good chances of again contaminating the vinyl chloride.

It is an object of the present invention, therefore, to provide an improved method for obtaining vinyl chloride of extremely high purity.

It is a further object of the invention to provide a method for purification of vinyl chloride containing impurities which cannot be readily separated by distillation.

It is a specific object of the invention to provide a process for the removal of minor amounts of HCl from vinyl chloride.

These and other objects and advantages of the invention which will become apparent from the following description are attained by the process of the invention wherein vinyl chloride is subjected to fractional distillation in the presence of a compound chosen from the group consisting of pyridine and alkyl-substituted pyridines. In the preferred embodiment of the invention, the pyridine or substituted pyridine is dissolved in a suitable solvent and the solution is fed to the fractionating column at a point at least several trays above the point at which the vinyl chloride contaminated with HCl is introduced. The rising vinyl chloride containing HCl is scrubbed by the pyridine solution descending the column. The pyridine hydrochloride formed either in solution or suspension continues down the column together with any unreacted pyridine solution and these compounds are ejected from the system in the bottoms stream from the column. The process is readily operated on a continuous basis and can be controlled by a pH monitor on the overhead vinyl chloride stream to insure that only the minimum amount of pyridine required to maintain HCl at the desired level is added.

The process of the invention is illustrated in the following example which, however, is not to be construed as limiting it in any manner whatsoever.

Example

A laboratory bubble-cap distillation column was set up consisting essentially of a countercurrent scrubber section with a fractionation section superimposed thereon and a reboiler flask provided with a heating mantle. The column was equipped with a vapor dividing head to assure that all the HCl going overhead would be measured. Vinyl chloride containing given amounts of injected HCl was introduced into the column at a point about one-third the way up and a solution of pyridine in hexane as a diluent was fed at about the mid-point of the column. The column was operated with a 2:1 reflux ratio controlled by the vapor dividing head. The vinyl chloride overhead product vapors were passed through a condenser and the liquid condensate was drained directly into a flask. The contents of the flask were analyzed for HCl by non-aqueous titration with standard base. Sensitivity of the analysis was 0.05 p.p.m. The results of several such distillations using various mol ratios of pyridine to HCl presented below demonstrate that HCl can be substantially completely removed from the vinyl chloride by this method of purification.

| Run No. | HCl in Feed (p.p.m.) | Mol Ratio Pyridine/HCl | HCl in Vinyl Chloride Overhead (p.p.m.) |
|---|---|---|---|
| 1 | 525 | 0 | 80 |
|   | 525 | 2 | 54 |
|   |     | 4 | 2.0 |
|   |     | 6 | 0.3 |
| 2 | 820 | 0 | 87 |
|   | 820 | 3.4 | 4.1 |
|   | 820 | 4.5 | 2.0 |

The amount of pyridine or substituted pyridine to be employed in the process of the invention will vary depending upon the HCl content of the material being purified and the desired level of removal of HCl. In order to effect most efficient removal of substantially all the HCl present, pyridine or substiuted pyridine is fed to the column in which the monomer contaminated with HCl is being distilled in an amount sufficient to provide a 1 to 5 molar excess over the amount of HCl to be removed. Preferably, the mol ratio of pyridine to HCl is maintained at about 2:1 to 3:1.

The pyridine reactant is introduced into the distilling column as a solution. Any solvent which is inert in the system and which is sufficiently higher-boiling than vinyl chloride to permit easy separation by fractionation can be used for dissolving the pyridine treating agent. Suitable solvents in addition to the hexane exemplified include, for example, dichloroethane, trichloroethylene, benzene, toluene, xylenes, and the like. Particularly preferred is 1,2-dichloroethane, small amounts of which are normally present in crude vinyl chloride. Because pyridine hydrochlorides which are formed in the treatment of vinyl chloride are soluble in dichloroethane, the fractionating column operation is free of difficulties which might otherwise be encountered from solid deposits forming in the column. The column is kept clean by the washing action of the solvent which carries any suspended materials down to the bottom of the column for ready disposal. Also, if a plug does occur, operation of the column can be interrupted, it can be washed out with dichloroethane and then returned to operation without the necessity of introducing contamination from any foreign materials.

In addition to pyridine itself, alkyl-substituted pyridines such as methyl pyridine, ethyl pyridine, dimethyl pyridine, methyl ethyl pyridine, propyl pyridine, diisopropyl pyridine, ethyl propyl pyridine, and the like can be employed in practicing the invention. Other amines also are useful in the process of the invention although not so efficient as the pyridines, especially from the standpoint of column fouling. Included among the other amines which can be used are, for example, di-n-butyl amine, diisopropyl amine, t-butyl amine, aniline and the like.

What is claimed is:

1. The process of purifying vinyl chloride containing minor amounts of HCl which comprises introducing said vinyl chloride into the lower section of a distillation zone, introducing a solution of a compound chosen from the group consisting of pyridine and alkyl-substituted pyridines in an inert organic solvent into the mid-section of said distillation zone, the amount of said compound contained in said solution being such as to provide a molar excess from about 1 to about 5 over the amount of HCl in said vinyl chloride, and recovering said vinyl chloride overhead by distillation from said distillation zone substantially free of HCl.

2. The process of purifying vinyl chloride containing minor amounts of HCl which comprises introducing said vinyl chloride into the lower section of a distillation zone, introducing a solution of pyridine in an inert organic solvent into the mid-section of said distillation zone, the amount of pyridine contained in said solution being such as to provide a molar excess of from about 1 to about 5 over the amount of HCl contained in said vinyl chloride, and recovering said vinyl chloride overhead by distillation from said distillation zone substantially free of HCl.

3. The process of claim 2 wherein said inert organic solvent is hexane.

4. The process of claim 2 wherein said inert organic solvent is 1,2-dichloroethane.

5. The process of claim 3 wherein the mol ratio of pyridine to HCl is from about 2:1 to about 3:1.

6. The process of claim 4 wherein the mol ratio of pyridine to HCl is from about 2:1 to about 3:1.

References Cited by the Examiner

UNITED STATES PATENTS

| 2,025,024 | 12/1935 | Britton et al. | 260—652 |
| 2,038,538 | 4/1936 | Carothers | 260—655 |

FOREIGN PATENTS

| 563,838 | 9/1958 | Canada. |
| 874,561 | 8/1961 | Great Britain. |

OTHER REFERENCES

MacArdle: Use of Solvents in Synthetic Organic Chemistry (Van Nostrand, 925), p. 111.

LEON ZITVER, *Primary Examiner.*

ALPHONSO D. SULLIVAN, *Examiner.*